(12) United States Patent
Hakura et al.

(10) Patent No.: US 9,952,868 B2
(45) Date of Patent: Apr. 24, 2018

(54) TWO-PASS CACHE TILE PROCESSING FOR VISIBILITY TESTING IN A TILE-BASED ARCHITECTURE

(71) Applicant: NVIDIA Corporation, Santa Clara, CA (US)

(72) Inventors: Ziyad S. Hakura, Gilroy, CA (US); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 813 days.

(21) Appl. No.: 14/043,432

(22) Filed: Oct. 1, 2013

(65) Prior Publication Data

US 2014/0118347 A1  May 1, 2014

Related U.S. Application Data

(60) Provisional application No. 61/719,271, filed on Oct. 26, 2012.

(51) Int. Cl.
*G06F 9/38* (2006.01)
*G06F 9/44* (2006.01)
(Continued)

(52) U.S. Cl.
CPC .......... *G06F 9/38* (2013.01); *G06F 9/44* (2013.01); *G06F 12/0808* (2013.01); *G06F 12/0875* (2013.01); *G06T 1/20* (2013.01); *G06T 1/60* (2013.01); *G06T 15/005* (2013.01); *G06T 15/405* (2013.01); *G06T 15/503* (2013.01); *G06T 15/80* (2013.01); *G09G 5/003* (2013.01);
(Continued)

(58) Field of Classification Search
None
See application file for complete search history.

(56) References Cited

U.S. PATENT DOCUMENTS 6,323,860 B1  11/2001  Zhu et al.
6,535,209 B1   3/2003  Abdalla et al.
(Continued)

OTHER PUBLICATIONS

Non-Final Office Action for U.S. Appl. No. 14/046,249 dated May 10, 2016.
Non-Final Office Action for U.S. Appl. No. 14/045,361 dated Feb. 26, 2016.

*Primary Examiner* — James A Thompson
(74) *Attorney, Agent, or Firm* — Artegis Law Group, LLP

(57) ABSTRACT

One embodiment of the present invention sets forth a graphics processing system. The graphics processing system includes a screen-space pipeline and a tiling unit. The screen-space pipeline is configured to perform visibility testing and fragment shading. The tiling unit is configured to determine that a first set of primitives overlaps a first cache tile. The tiling unit is also configured to first transmit the first set of primitives to the screen-space pipeline with a command configured to cause the screen-space pipeline to process the first set of primitives in a z-only mode, and then transmit the first set of primitives to the screen-space pipeline with a command configured to cause the screen-space pipeline to process the first set of primitives in a normal mode. In the z-only mode, at least some fragment shading operations are disabled in the screen-space pipeline. In the normal mode, fragment shading operations are enabled.

20 Claims, 10 Drawing Sheets

(51) Int. Cl.

| | | |
|---|---|---|
| *G06T 15/00* | (2011.01) | |
| *G06T 15/40* | (2011.01) | |
| *G06T 1/20* | (2006.01) | |
| *G06T 1/60* | (2006.01) | |
| *G06T 15/50* | (2011.01) | |
| *G09G 5/00* | (2006.01) | |
| *G09G 5/393* | (2006.01) | |
| *G09G 5/395* | (2006.01) | |
| *G06F 12/0808* | (2016.01) | |
| *G06F 12/0875* | (2016.01) | |
| *G06T 15/80* | (2011.01) | |

(52) U.S. Cl.
CPC ....... *G09G 5/395* (2013.01); *G06F 2212/302* (2013.01); *Y02B 60/1225* (2013.01)

(56) References Cited

U.S. PATENT DOCUMENTS

| | | |
|---|---|---|
| 6,697,063 B1 | 2/2004 | Zhu et al. |
| 7,102,646 B1 | 9/2006 | Rubinstein et al. |
| 7,170,515 B1 | 1/2007 | Zhu et al. |
| 8,605,102 B1 | 12/2013 | Purcell et al. |
| 2009/0058848 A1 | 3/2009 | Howson |
| 2010/0169608 A1 | 7/2010 | Kuo et al. |
| 2011/0080406 A1* | 4/2011 | Hakura .................. G06T 15/50 345/426 |
| 2012/0229445 A1* | 9/2012 | Jenkins .................. G06T 15/20 345/418 |
| 2012/0281004 A1* | 11/2012 | Shebanow ............... G09G 5/36 345/557 |

* cited by examiner

TWO-PASS CACHE TILE PROCESSING FOR VISIBILITY TESTING IN A TILE-BASED ARCHITECTURE

CROSS-REFERENCE TO RELATED APPLICATIONS

This application claims benefit of U.S. Provisional Patent Application Ser. No. 61/719,271, filed Oct. 26, 2012 and titled, "An Approach for Tiled Caching." The subject matter of this related application is hereby incorporated herein by reference.

BACKGROUND OF THE INVENTION

Field of the Invention

Embodiments of the present invention relate generally to graphics processing and, more specifically, to two pass cache tile processing for visibility testing in a tile-based architecture.

Description of the Related Art

Graphics processing subsystems typically write depth information to a depth buffer that stores depth information for samples and pixels. When the graphics subsystem processes fragments, the graphics processing system compares depth values associated with those fragments with the depth values stored in the depth buffer. This comparison is referred to as a "z-test." For any particular fragment, if the z-test is successful and the fragment is visible, then the fragment is written to the frame buffer or blended with color data already in the frame buffer. If, on the other hand, the fragment does not pass the visibility test, then the fragment is discarded.

Some graphics processing subsystems additionally include a z-cull unit and an early-z unit that are configured to perform early visibility tests on fragments prior to shading the fragments. Such early visibility testing allows non-visible fragments to be discarded prior to fragment shading, which saves the processing cycles and power associated with shading fragments that ultimately would be discarded during z-testing.

Some graphics processing subsystems implement a tile-based architecture, where one or more render targets, such as a frame buffer, are divided into screen space partitions referred to as "tiles." In such a tile-based architecture, the graphics processing subsystem rearranges work such that the work associated with any particular tile remains in an on-chip cache for a longer time than with an architecture that does not rearrange work in this manner. This rearrangement helps to improve memory bandwidth as compared with a non-tiling architecture.

Some conventional tiling architectures perform visibility testing before pixel shading to reduce overdraw. However, many of these conventional tiling architectures introduce latency associated with reading the depth data necessary for the visibility testing operations.

As the foregoing illustrates, what is needed are more effective techniques for discarding non-visible pixels in a tile-based architecture.

SUMMARY OF THE PRESENT INVENTION

One embodiment of the present invention sets forth a graphics processing system configured to perform visibility testing in a tile-based architecture. The graphics processing system includes a screen-space pipeline and a tiling unit. The screen-space pipeline is configured to perform visibility testing and fragment shading operations. The tiling unit is configured to determine that a first set of primitives overlaps a first cache tile. The tiling unit is also configured to first transmit the first set of primitives to the screen-space pipeline with a first command configured to cause the screen-space pipeline to process the first set of primitives in a z-only mode, and then transmit the first set of primitives to the screen-space pipeline with a second command configured to cause the screen-space pipeline to process the first set of primitives in a normal mode. In the z-only mode, fragment shading operations are disabled in the screen-space pipeline and in the normal mode, fragment shading operations are enabled in the screen-space pipeline.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
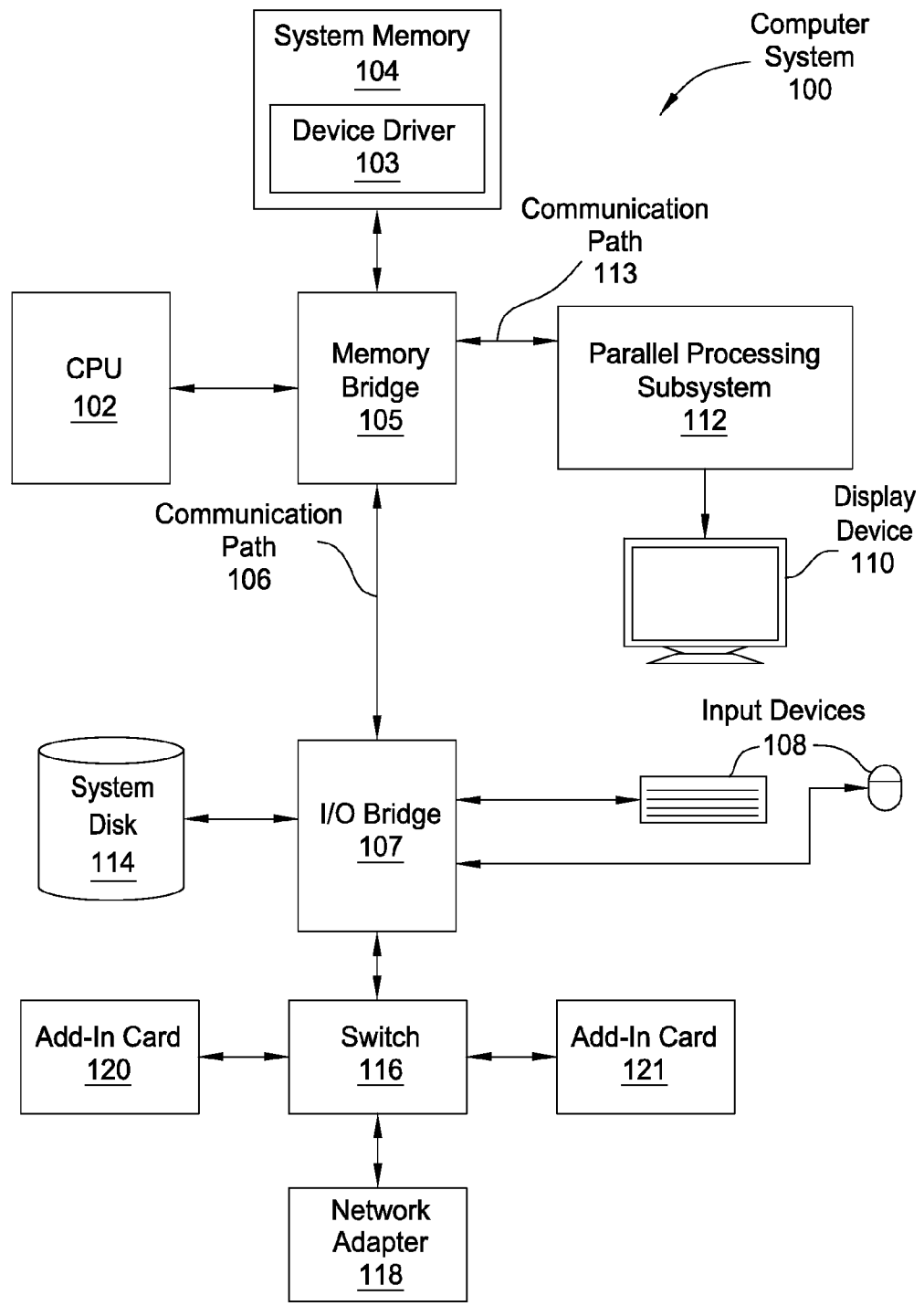
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
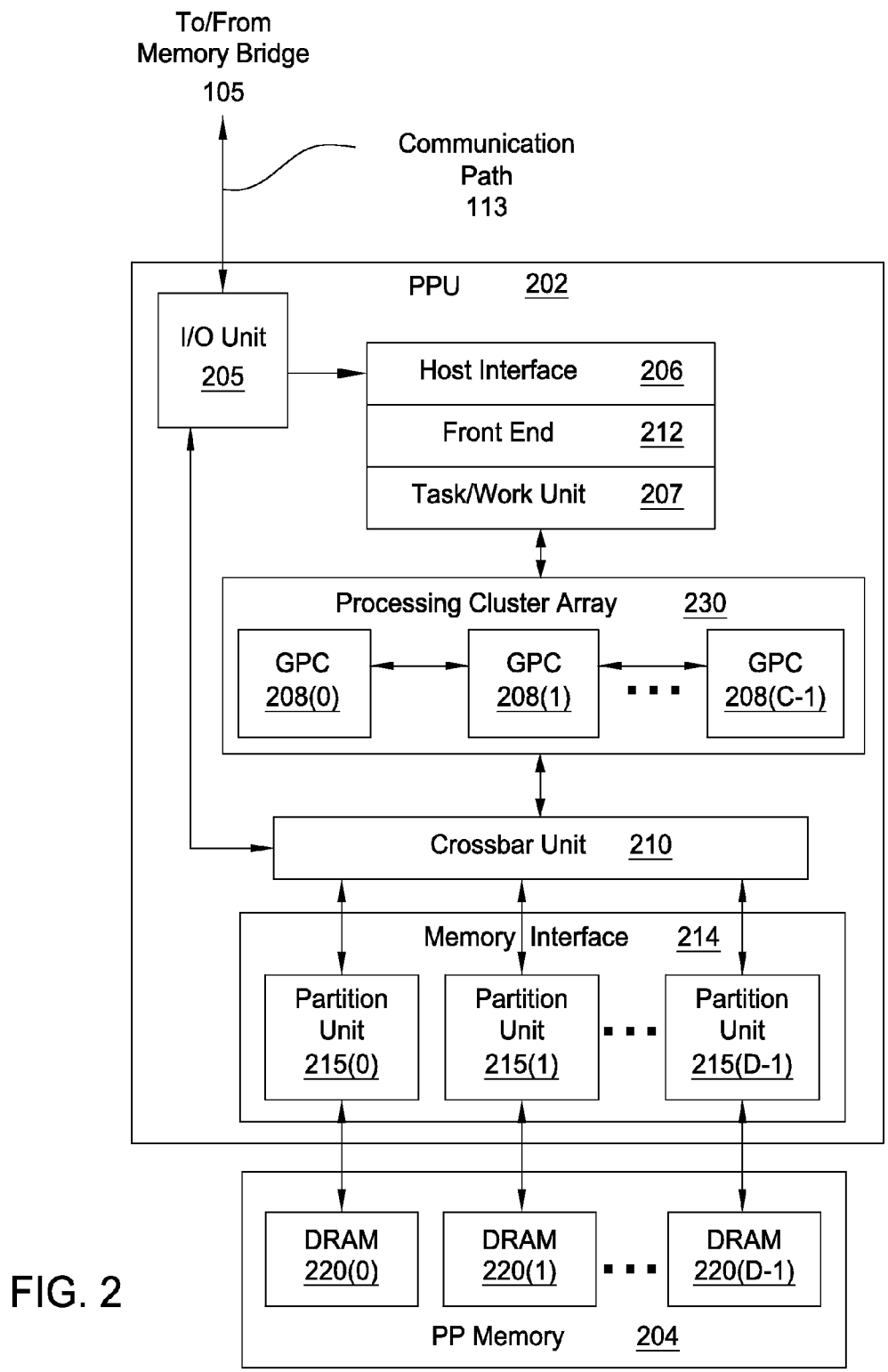
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
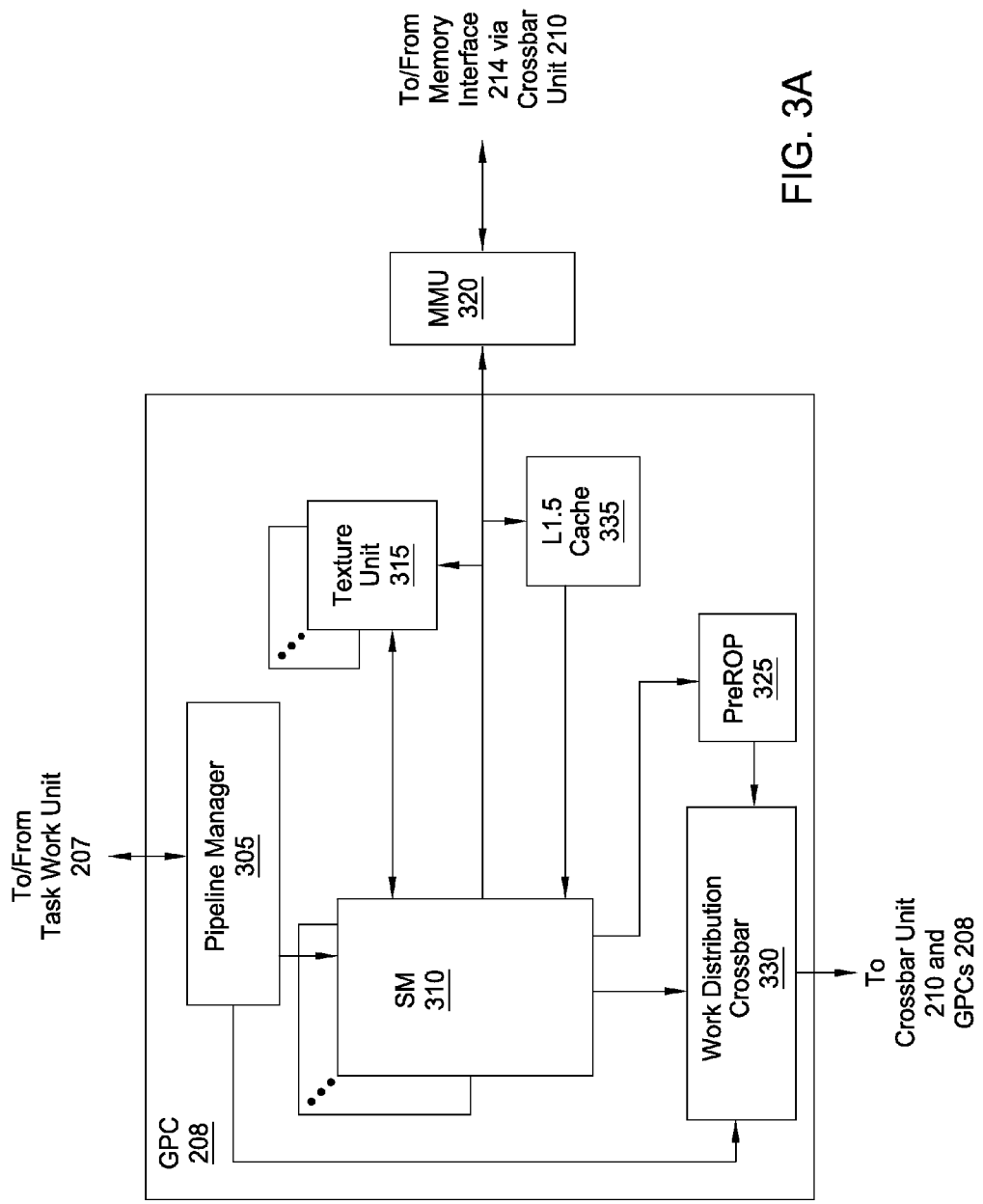
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units.

Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
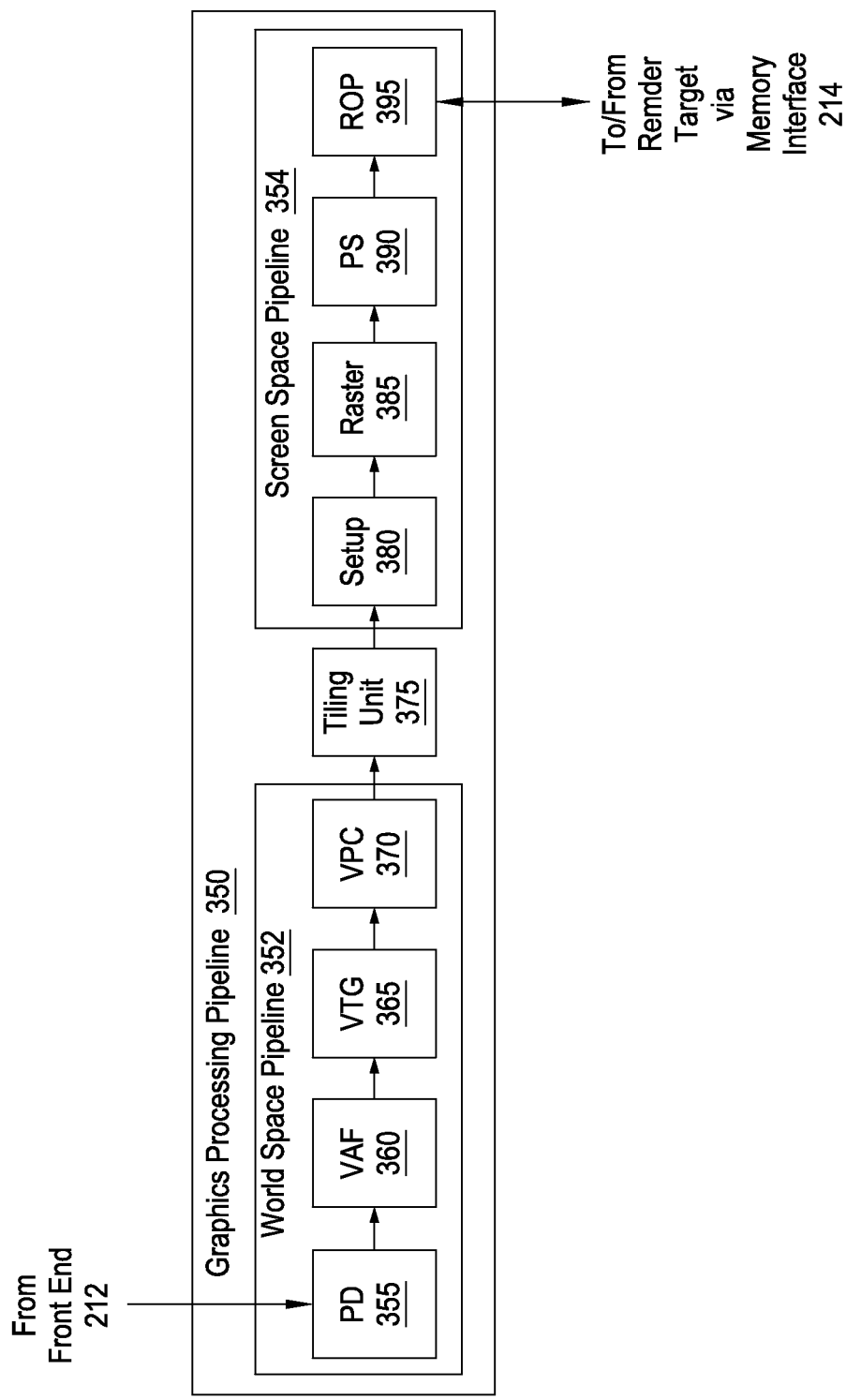
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360, and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
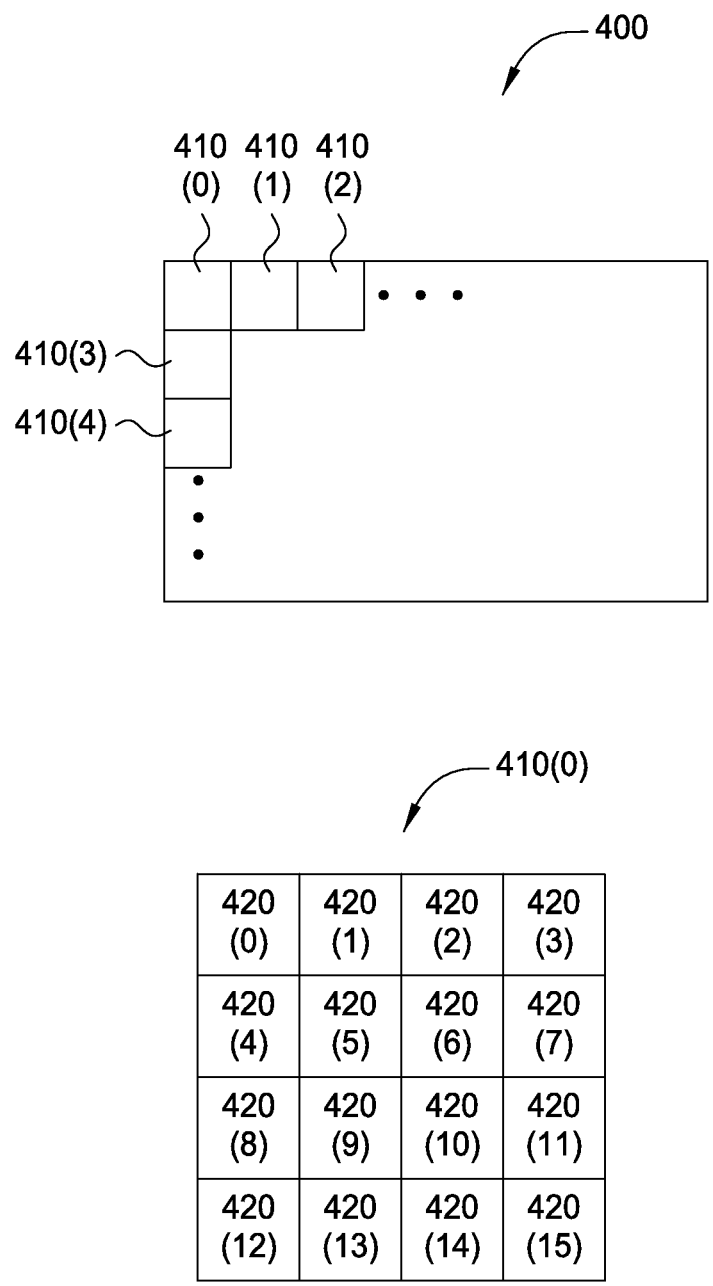
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Tiling Unit Operation

Figure 5:
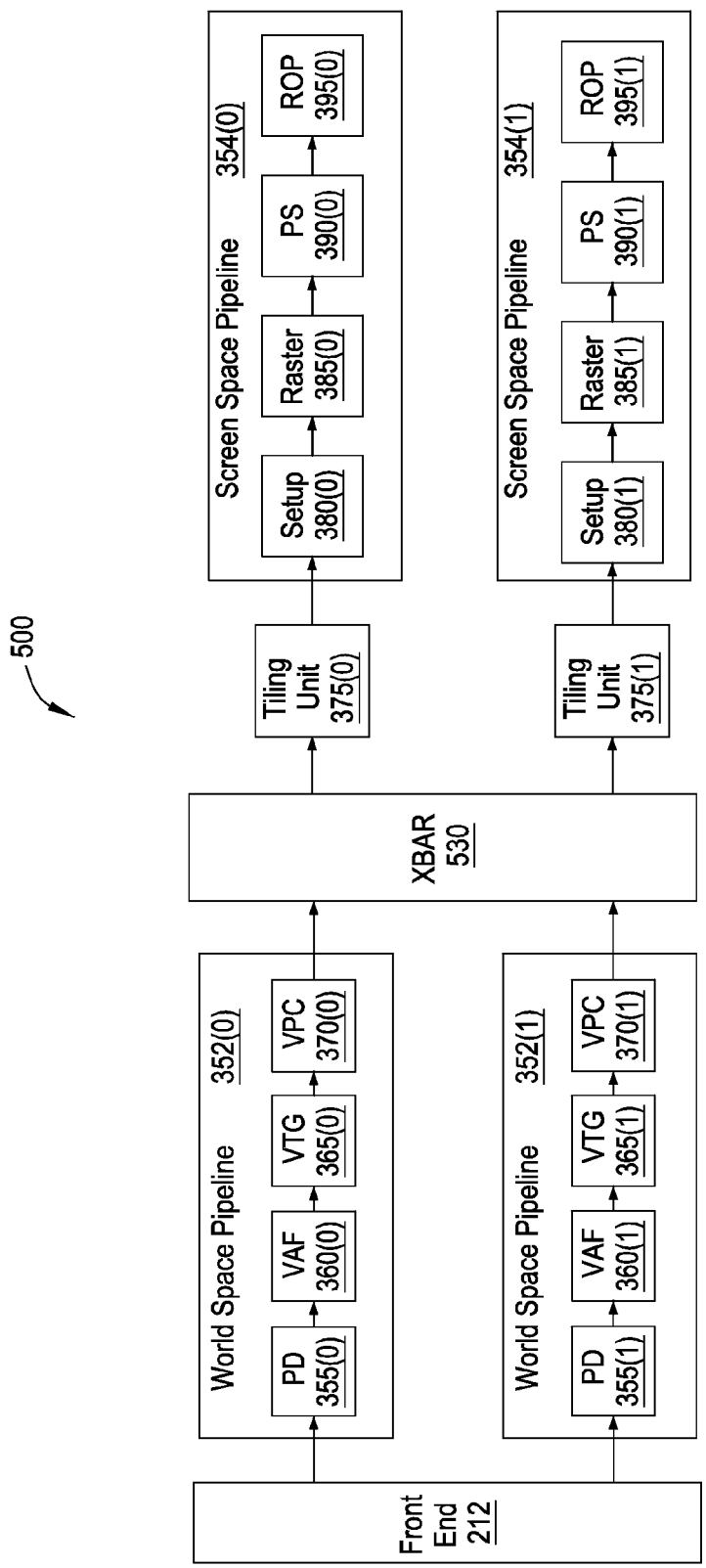
FIG. 5 is a block diagram of a graphics subsystem configured to implement cache tiling, according to one embodiment of the present invention.

FIG. 5 illustrates a graphics subsystem configured to implement cache tiling, according to one embodiment of the present invention. The graphics subsystem 500 illustrates several units that are described above with respect to FIG. 3B. As shown, the graphics subsystem 500 includes a front end unit 212, a first world-space pipeline 352(0), a second world-space pipeline 352(1), a crossbar unit 530 ("XBAR"), a first tiling unit 575(0), a second tiling unit 575(1), a first screen-space pipeline 354(0), and a second screen-space pipeline 354(1).

The graphics subsystem 500 includes at least two instances of the screen-space pipeline 354 and the world-space pipeline 352, for increased performance. The graphics subsystem 500 also includes a crossbar unit 530 for transmitting work output from the first world-space pipeline 352(0) and the second world-space pipeline 352(1) to the first tiling unit 575(0) and the second tiling unit 575(1). Although depicted in FIG. 5 with two instances of the world-space pipeline 352 and the screen-space pipeline 354, the teachings provided herein apply to graphics pipelines having any number of world-space pipelines 352 and screen-space pipelines 354. Each of the screen-space pipeline 354 and the world-space pipeline 352 are described in more detail above with respect to FIG. 3B.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 354 may be implemented in a different GPC 208, and in a similar fashion, each world-space pipeline 352 may be implemented in a different GPC 208. Further, a given GPC 208 can implement a world-space pipeline 352 and also a screen-space pipeline 354. For example, the first GPC 208(0) may implement both the first world-space pipeline 352(0) and the first screen-space pipeline 354(0). In embodiments that include more than one screen-space pipeline 354, each screen-space pipeline 354 is associated with a different set of raster tiles 420 for any particular render target. Again, each of the screen-space pipeline 354 and world-space pipeline 352 are described in more detail above with respect to FIG. 3B.

Each of the pipeline units in the world-space pipelines 352 (i.e., primitive distributor 355, vertex attribute fetch unit 360, vertex, tessellation, geometry processing unit 365, and viewport scale, cull, and clip unit 370) and in the screen-space pipelines 354 (i.e., setup 380, rasterizer 385, pixel shader 390, and ROP 395) depicted in FIG. 5 functions in a similar manner as described above with respect to FIGS. 1-4.

A device driver 103 transmits instructions to the front end unit 212. The instructions include primitives and commands to bind render targets, arranged in application-programming-interface order (API order). API order is the order in which the device driver 103 specifies that the commands should be executed and is typically specified by an application executing on CPU 102. For example, an application may specify that a first primitive is to be drawn and then that a second primitive is to be drawn. The application may also specify that certain work is to be rendered to a particular render target, or that one or more render targets are to be bound.

When the front end unit 212 receives the instructions from the device driver 103, the front end unit 212 distributes tasks associated with the instructions to the world-space pipelines 352 for processing. In one embodiment, the front end unit 212 assigns tasks to the first world-space pipeline 352(0) and the second world-space pipeline 352(1) in round-robin order. For example, the front end unit 212 may transmit tasks for a first batch of primitives associated with the instructions to the first world-space pipeline 352(0) and tasks for a second batch of primitives associated with the instructions to the second world-space pipeline 352(1).

Each of the first world-space pipeline 352(0) and second world-space pipeline 352(1) processes tasks associated with the instructions, and generate primitives for processing by the first screen-space pipeline 354(0) and the second screen-space pipeline 354(1). The first world-space pipeline 352 (0) and second world-space pipeline 352(1) each include a bounding box generator unit (not shown) that determines to which screen space pipeline—the first screen-space pipeline 354(0) or the second screen-space pipeline 354(1)—each primitive should be transmitted. To make this determination, the bounding box generator unit generates bounding boxes for each primitive, and compares the bounding boxes to raster tiles 420. If a bounding box associated with a primitive overlaps one or more raster tiles associated with a particular screen-space pipeline 354, then the bounding box generator unit determines that the primitive is to be transmitted to that screen-space pipeline 354. A primitive may be transmitted to multiple screen-space pipelines 354 if the primitive overlaps raster tiles 420 associated with more than one screen-space pipeline 354. After the world-space pipelines 352 generate the primitives, the world-space pipelines 352 transmit the primitives to the crossbar unit 530, which transmits the primitives to the corresponding tiling units 375 as specified by the bounding box generator unit.

The tiling units 575 receive primitives from the crossbar unit 530. Each tiling unit 575 accepts and stores these primitives until the tiling unit 575 decides to perform a flush operation. Each tiling unit 575 decides to perform a flush operation when one or more resource counters maintained by the tiling units 575 indicates that a resource has exceeded a threshold. Each tiling unit 575 may also perform a flush operation upon receiving a command from upstream in the graphics processing pipeline 500 requesting that the tiling unit 575 perform a flush operation. Such a command is referred to herein as a "flush-tiling-unit command." The device driver 103 may transmit the flush-tiling-unit command to the graphics processing pipeline 500 in situations that the device driver 103 deems appropriate.

Upon receiving primitives, a tiling unit 575 updates several resource counters associated with the primitives. The resource counters are configured to track the degree of utilization of various resources associated with the primitives received by the tiling units 575. Resources are either global resources or local resources. Global resources are pools of resources that are shared by all screen-space pipelines 354 and world-space pipelines 352. Local resources are resources that not shared between screen-space pipelines 354 or between world-space pipelines 352. Several examples of local and global resources are now provided.

One type of local resource is a primitive storage space for storing primitives in a tiling unit 575. Each tiling unit 575 includes a primitive storage space that is maintained independently of primitive storage space for other tiling units 575. When a tiling unit 575 receives a primitive, some of the primitive storage space is occupied by the primitive. Because only a limited amount of primitive storage space exists for each tiling unit 575, exceeding a threshold amount of storage space in a particular tiling unit 575 causes the tiling unit 575 to perform a flush operation.

One type of global resource is a vertex attribute circular buffer. The vertex attribute circular buffer includes circular buffer entries that include vertex attributes. The vertex attribute circular buffer is available to units in the graphics subsystem 500 for reading vertex attributes associated with primitives. Each circular buffer entry in the vertex attribute circular buffer occupies a variable amount of storage space. Each tiling unit 575 maintains a count of the amount of space occupied by circular buffer entries associated with primitives in the tiling unit 575.

In one embodiment, the vertex attribute circular buffer may be structured as a collection of smaller per-world-space-pipeline circular buffers. Each per-world-space pipeline circular buffer is associated with a different world-space pipeline 352. If memory space associated with any of the per-world-space-pipeline circular buffers exceed a threshold value, then the associated tiling unit performs a flush operation.

Another type of global resource is a pool of constant buffer table indices. At the application-programming-interface level, an application programmer is permitted to associate constants with shader programs. Different shader programs may be associated with different constants. Each constant is a value that may be accessed while performing computations associated with the shader programs. The pool of constant buffer table indices is a global resource by which constants are associated with shader programs.

When a tiling unit 575 performs a flush operation, the tiling unit 575 iterates through all of the cache tiles 410, and for each cache tile 410, generates a cache tile batch that includes primitives that overlap the cache tile 410, and transmits the cache tile batches to the associated screen-space pipeline 354. Each tiling unit 575 is associated with a different screen-space pipeline 354. Thus, each tiling unit 575 transmits cache tile batches to the associated screen-space pipeline 354.

The tiling unit 575 transmits these cache tile batches to the screen-space pipeline 354 associated with the tiling unit as the cache tile batches are generated. The tiling unit 575 continues to generate and transmit cache tile batches in this manner for all cache tiles 410 associated with a render target. In one embodiment, the tiling unit 575 determines which primitives overlap a cache tile 410 by comparing a border of the cache tile 410 with bounding boxes associated with the primitives and received from the bounding box unit.

The cache tile batches flow through the screen-space pipelines 354 in the order in which the tiling unit 575 generates the cache tile batches. This ordering causes the units in the screen-space pipelines 354 to process the primitives in cache tile order. In other words, the screen-space pipelines 354 process primitives that overlap a first cache tile, and then process primitives that overlap a second cache tile, and so on.

Conceptually, each cache tile batch can be thought of as beginning at the point in time at which the tiling unit 575 began accepting primitives after the previous flush operation. In other words, even though the cache tile batches are transmitted to and processed by the screen-space pipelines 354 sequentially, each cache tile batch logically begins at the same point in time. Of course, because the cache tiles generally do not overlap in screen space, sequential processing in this manner generally produces the desired results.

When the tiling unit 575 transmits cache tile batches to the screen-space pipeline 354 for processing, certain units within the screen-space pipeline 354 cause data associated with the cache tile batches to be accessed. For example, the raster operations unit 395 writes pixel color data to the frame buffer. Such data is generally resident in an external memory unit, such as PP memory 204, and may additionally be resident in a cache unit, such as an L2 cache, which serves to accelerate memory accesses, as is well-known. Generally speaking, if data accessed during the processing described above is not stored in the L2 cache, then a cache miss occurs, and the L2 cache fetches the data from an external memory unit such as PP memory 204.

By reorganizing data based on cache tiles, data accesses to the L2 cache are consolidated. Because the data accesses are consolidated, once all of the data associated with a cache tile batch is loaded into the L2 cache, little to no additional data for that cache tile generally is read in from the external memory unit while processing the cache tile batch. In other words, once all data associated with a particular cache tile is loaded into the L2 cache, few to no additional cache misses occur, at least while the cache tile batch associated with the particular cache tile is being processed.

When the screen-space pipeline 354 transitions from processing one cache tile to processing a different cache tile, a certain amount of latency may occur. This latency is associated with evicting cache lines from the L2 cache associated with old cache tiles, and/or reading in data from an external memory unit to the L2 cache associated with the next cache tile. Because a latency occurs, some advantage in processing power may be gained by performing additional operations for a cache tile while the data associated with that cache tile is still in the L2 cache. Performing this additional work takes advantage of the fact that the data for a particular cache tile is already resident in the L2 cache. With the data resident in the L2 cache, the additional work may be performed without incurring overhead associated with cache latency.

Visibility testing is one such task that can be performed prior to a cache tile being evicted from a cache. Again, "visibility" testing is generally a process of comparing depth values (or "z-values") of incoming fragments against previously stored depth values associated with previously observed fragments. Fragments that are "behind" previously observed fragments (i.e., fragments having a z-value that is greater than previously observed z-values in the same screen-space position) are discarded and not processed further or written to the frame buffer. To take advantage of data already stored in the L2 cache related to a particular cache tile, each cache tile may be processed in a first pass, in which at least some fragment shading programs are not executed by the pixel shader 390 and only depth information is calculated (a "z-only mode" pass), and, subsequently, in a second pass, in which fragment shading programs are executed by the pixel shader 390 to perform fragment shading (a "normal mode" pass). To cause the screen-space pipeline 354 to execute in either the z-only mode or the normal mode, the tiling unit 575 includes state data with the primitives that overlap a particular cache tile, where the state data is configured to indicate to the different execution units included in the screen-space pipeline the mode that should be executed. More detailed descriptions of the z-only mode pass and the normal mode pass are set forth below with respect to FIGS. 6A-8.

Two Pass Cache Tile Processing for Visibility Testing

Figure 6A:
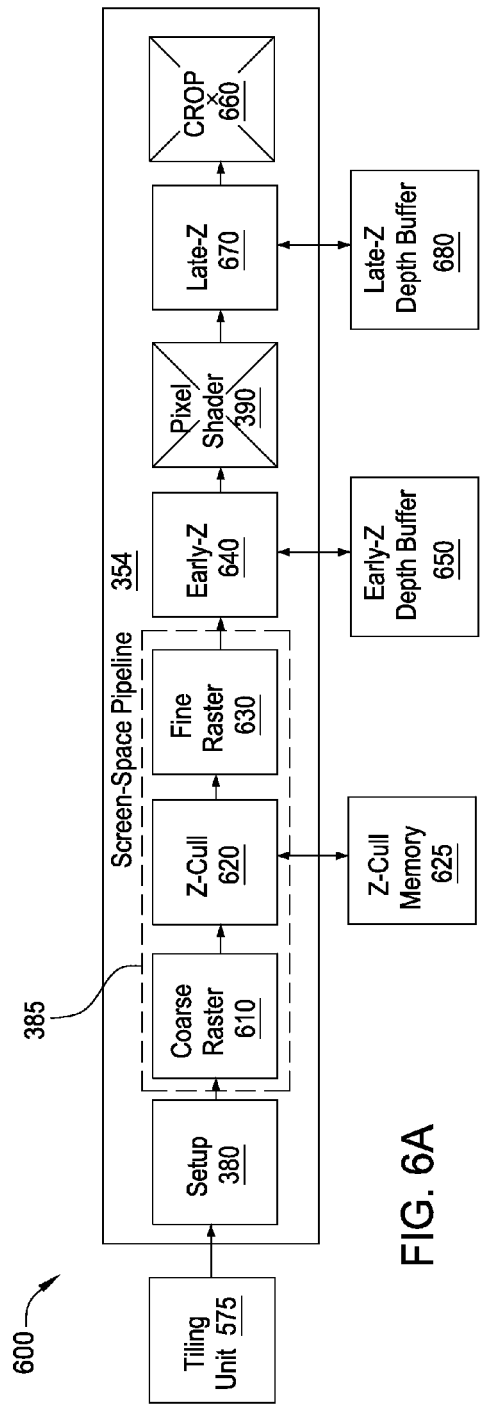
FIG. 6A depicts the screen-space pipeline of FIG. 5 in a z-only mode configuration, according to one embodiment of the present invention.

FIG. 6A depicts the screen-space pipeline 354 of FIG. 5 in a z-only mode configuration 600, according to one embodiment of the present invention. As shown, the screen-space pipeline 354 includes a rasterizer 385, which includes a coarse raster unit 610, a z-cull unit 620, and a fine raster unit 630. The screen-space pipeline 354 also includes an early-z unit 640 and a late-z unit 670.

The coarse raster unit 610 rasterizes primitives received from setup 380 to a coarse resolution. In other words, the coarse raster unit 610 determines coverage of the received primitives for a coarse grid, where each element in the coarse grid includes a plurality of samples and/or pixels in the render target.

The z-cull unit 620 culls groups of fragments that fail a visibility test. More specifically, the z-cull unit 620 stores a coarse representation of a surface to which primitives are to be rendered in z-cull memory 625. The z-cull unit 620 stores depth information for each element in the coarse representation. In operation, the z-cull unit 620 compares depth values for groups of fragments to the depth information stored for each element in the coarse representation and discards the groups of fragments if all of them fail the visibility test. If a group of fragments passes the visibility test, the z-cull unit 620 updates depth values for the element in the coarse representation stored in the z-cull memory 625 associated with the group of fragments. The z-cull unit 620 observes coarse depth data from incoming fragments. The z-cull unit 620 updates the depth values stored in the z-cull memory 625 based on the feedback and also based on the observed coarse depth data. The z-cull unit 620 also receives feedback from the early-z unit 640 and the late-z unit 670 that includes a fine representation of depth data. In other words, because the z-cull memory 625 stores a coarse representation of depth data, the early-z unit 640 and late-z unit 670, which process depth data at a fine resolution, provide feedback to the z-cull memory 625 to improve the accuracy of the stored coarse representation.

The fine raster unit 630 rasterizes primitives received from setup 380 to a fine resolution. In other words, the fine raster unit 630 determines coverage of the received primitive for a full resolution grid, where each element in the full resolution grid corresponds to a sample in the render target.

The early-z unit 640 performs visibility testing and updates an early-z depth buffer 650. The early-z depth buffer 650 stores z-information for each sample in a particular render target. The early-z unit 640 compares z values for incoming fragments with z values stored in the early-z depth buffer 650. If the incoming fragments fail the visibility test, then those fragments are discarded. If the incoming fragments pass the visibility test, then those fragments are not discarded, and the early-z depth buffer 650 is updated to reflect the depth value for those fragments.

As described above, the pixel shader 390 is configured to execute fragment shader programs on incoming fragments in order to shade the fragments. The color raster operations unit (CROP) 660 is configured to receive shaded fragments and perform color raster operations, such as blending operations on the received fragments.

By discarding fragments that do not pass the visibility test, the z-cull unit 620 and early-z unit 640 function to limit the number of fragments that are processed by the pixel shader 390. Further, the fragments that are not processed by the pixel shader 390 are fragments that would be discarded anyway, due to being occluded by other fragments already processed. Therefore, the z-cull unit 620 and early-z unit 640 function to prevent the pixel shader 390 from shading fragments that are discarded anyway, thereby saving processing cycles.

The late-z unit 670 performs visibility testing and updates a late-z depth buffer 680. Like the early-z depth buffer 650, the late-z depth buffer 680 stores z-information for each sample in a particular render target. The late-z unit 670 compares z values for incoming fragments with z values stored in the late-z depth buffer 680 and discards the incoming fragments that fail the visibility test. For fragments that pass the visibility test, the late-z depth buffer 680 allows the fragments to proceed and updates the late-z depth buffer 680 to reflect the depth value for those fragments. If alpha testing is enabled, the late-z unit 670 also performs alpha testing.

In the z-only mode, either the early-z unit 640 or the late-z unit 670 may be enabled. In other words, either the early-z unit 640 or the late-z unit 670 may be selected to perform z-based operations in the z-only mode. As is known in the art, the late-z unit 670 is generally selected when z-data for fragments flowing through the pipeline would be updated by a unit that is downstream of the early-z unit 640. For example, the pixel shader 390 may modify z-data for fragments that the pixel shader 390 processes. In such a case, the early-z unit 640 would not be selected and the late-z unit 670 would be selected.

In the z-only mode configuration 600, the pixel shader 390 and CROP unit 660 are not fully enabled and do not execute at least some operations associated with fragment shader programs on the fragments or execute color raster operations on the fragments. In some embodiments, updating the z-cull memory 625 and early-z depth buffer 650 or late-z depth buffer 680 are only done for opaque geometry. If the late-z unit 670 is enabled, then the pixel shader 390 may at least execute pixel shader programs to determine z-values for fragments received by the pixel shader 390. The pixel shader 390 may also compute alpha for an alpha test when alpha testing is enabled.

Conceptually, the z-only pass allows the graphics pipeline to "look ahead" by one cache tile worth of z-data. More specifically, because the z-only pass writes depth data to the z-cull memory 625 and the early-z depth buffer 650 or late-z depth buffer 680, that depth data is available to the z-cull unit 620 and the early-z unit 640 during the subsequent normal mode pass. By contrast, if the z-only pass is not used, then only a single pass occurs. During this single pass, the z-cull memory 625 and the early-z depth buffer 650 or late-z depth buffer 680 would only have depth information up to the current pixels or fragment being examined. Depth information from a later point in the cache tile would not be available, since that data has not yet been written to either the z-cull memory 625 or the early-z depth buffer 650 or late-z depth buffer 680.

Figure 6B:
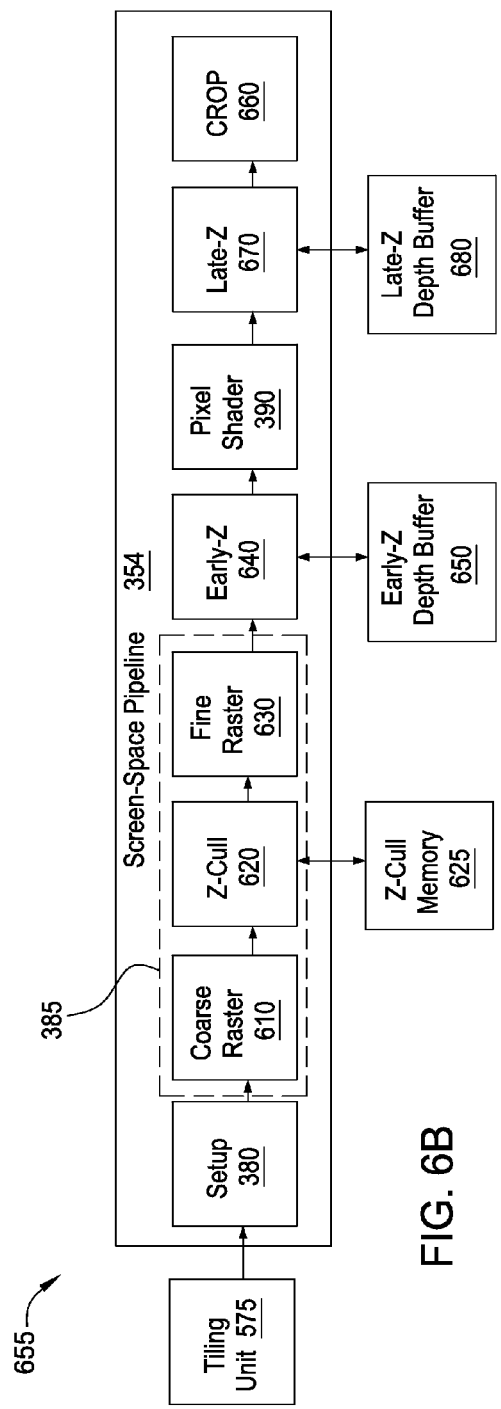
FIG. 6B depicts the screen-space pipeline of FIG. 5 in a normal mode configuration, according to one embodiment of the present invention.

FIG. 6B depicts the screen-space pipeline 354 of FIG. 5 in a normal mode configuration 655, according to one embodiment of the present invention. As shown, the screen-space pipeline 354 in the normal mode configuration 655 includes the same units as included in the screen-space pipeline 354 in the z-only mode configuration 600. However, in the normal mode configuration 655, the pixel shader 390 and CROP unit 660 are both enabled for non-z as well as for z-based processing. In other words, these units execute operations associated with their respective functionality on incoming fragments. However, because the z-cull unit 620 and the early-z unit 640 (in early-z mode) discard fragments that fail the visibility test, the pixel shader 390 and CROP unit 660 do not execute operations associated with their respective functionality on these discarded fragments. In this way, the two-pass scheme helps to reduce the amount of work executed by the pixel shader 390 and CROP unit 660.

The normal mode configuration 655 may be operated with either the early-z unit 640 or the late-z unit 670 enabled. With the early-z unit 640 enabled, the early-z unit 640 performs the functions described above. In other words, the early-z unit 640 receives incoming fragments, compares the z-data for the incoming fragments to z-data stored in the early-z depth buffer 650, and discards fragments whose corresponding z-value indicates that the fragment is "behind" the corresponding z-value stored in the early-z depth buffer 650. With the late-z unit 670 enabled, the late-z unit 670 performs a similar operation. In other words, the late-z unit 670 receives incoming fragments, compares the z-data for the incoming fragments to z-data stored in the late-z depth buffer 680, and discards fragments whose corresponding z-value indicates that the fragment is "behind" the corresponding z-value stored in the late-z depth buffer 680.

One difference between operating with the early-z unit 640 enabled and operating with the late-z unit 670 enabled is that the early-z unit 640 can cause fragments to be discarded prior to the pixel shader 390 while the late-z unit 670 cannot. However, like the early-z unit 640, the late-z unit 670 is still able to discard fragments prior to being written to a render target. Further, for these discard operations, the late-z unit 670 obtains the benefit of one cache tile worth of "look-ahead" z-data. Discarding such fragments reduces the amount of data written out by the screen-space pipeline 354, which reduces memory bandwidth consumption.

Figure 7A:
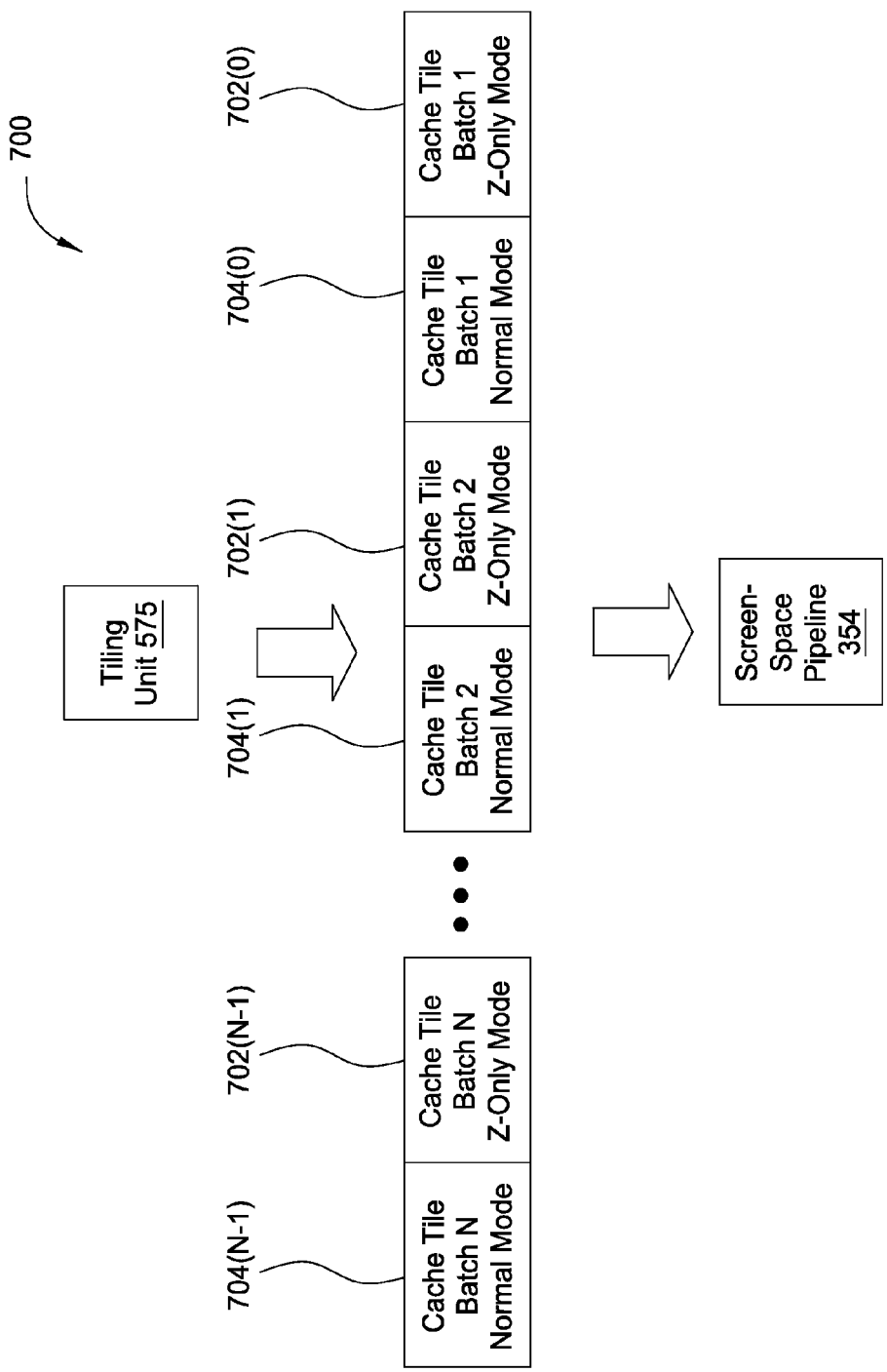
FIG. 7A illustrates a sequence of operations performed by the tiling unit to execute two-pass processing for visibility testing, according to one embodiment of the present invention.

FIG. 7A illustrates a first sequence of operations 700 performed by the tiling unit 575 to execute two-pass processing for visibility testing, according to one embodiment of the present invention. As shown, the sequence of operations 700 depicts a tiling unit 575 transmitting a sequence of cache tile batches to a screen space pipeline 354. The cache tile batches are configured in either a z-only mode (a z-only cache tile batch 702) or in a normal mode (a normal mode cache tile batch 704).

The tiling unit 575 generates the cache tile batches in a certain order in order to cause the screen-space pipeline 354 to perform the two-pass visibility test. More specifically, for each cache tile, the tiling unit 575 issues a cache tile batch in z-only mode 702 for the cache tile, and then a cache tile batch in normal mode 704 for the same cache tile. After issuing both the z-only mode cache tile batch 702 and the normal mode 704 for the cache tile, the tiling unit 575 proceeds to a subsequent cache tile and generates a z-only cache tile batch 702 and a normal mode cache tile batch 704 for that subsequent cache tile. The tiling unit 575 proceeds to generate z-only mode cache tile batches 702 and normal mode cache tile batches 704 for the cache tiles in a particular render target and transmits these cache tile batches to the screen-space pipeline 354 as the cache tile batches are generated.

The cache tile batches depicted in FIG. 7A include a first z-only mode cache tile batch 702(0), followed by a first normal mode cache tile batch 704(0), followed by a second z-only mode cache tile batch 702(1), followed by a normal mode cache tile batch 704(1). At the end of the cache tile batches depicted in FIG. 7A are a final z-only mode cache tile batch 702(N-1) and a final normal mode cache tile batch 704(N-1). Additional cache tile batches are generated by the tiling unit 575 but are not depicted in FIG. 7A.

Figure 7B:
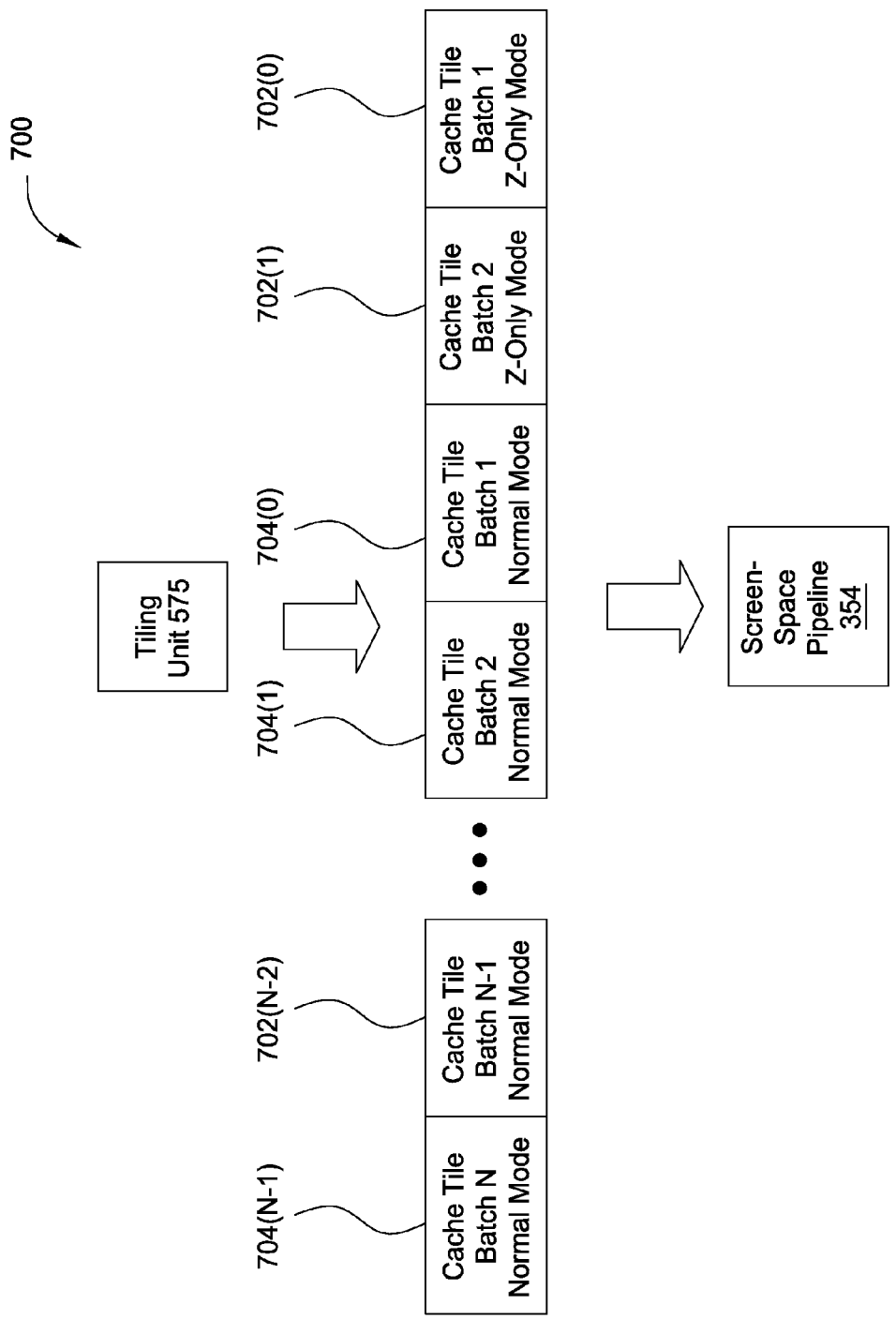
FIG. 7B illustrates another sequence of operations performed by a tiling unit to execute two-pass processing for visibility testing, according to one embodiment of the present invention.

FIG. 7B illustrates another sequence of operations 750 performed by a tiling unit 575 to execute two-pass processing for visibility testing, according to one embodiment of the present invention. As shown, the sequence of operations 750 depicts a tiling unit 575 transmitting a sequence of cache tile batches to a screen-space pipeline 354. As with FIG. 7A, the cache tile batches are configured in either a z-only mode (a z-only cache tile batch 702) or in a normal mode (a normal mode cache tile batch 704).

As with FIG. 7A, the tiling unit 575 generates the cache tile batches to cause the screen-space pipeline 354 to perform the two-pass visibility test. However, the order in which the tiling unit 575 generates the cache tile batches in FIG. 7B is different from the order in which the tiling unit 575 generates the cache tile batches in FIG. 7A. More specifically, the tiling unit 575 does not issue a z-only cache tile batch 702 and then a normal mode cache tile batch 704 for a single cache tile. Instead, the tiling unit 575 issues a z-only cache tile batch 702 for a first cache tile and then a z-only cache tile batch 702 for a second cache tile. Subsequently, the tiling unit 575 issues a normal mode cache tile batch 704 for the first cache tile and a normal mode cache tile batch 704 for the second cache tile.

By staggering the cache tile batches in this manner, the tiling unit 575 permits certain z-related feedback mechanisms to write depth data for a first cache tile in z-only mode before processing that cache tile in normal mode. More specifically, the early-z unit 640 may implement a feedback mechanism back to the z-cull unit 620 to update the z-cull memory 625 with values that are more accurate than what is generated by the coarse raster unit 610 and the z-cull unit 620 directly. Since the z-cull unit 620 and the coarse raster unit 610 generate coarse representations of z-based data, the early-z unit 640 is able to improve upon these coarse representations, which improves the effectiveness of the z-cull unit 620.

Staggering the cache tile batches as described above allows the early-z unit 640 to write data to the z-cull unit 620 through the feedback mechanisms. More specifically, and with respect to the specific cache tile batches depicted in FIG. 7B, when a first z-only cache tile batch 702(0) is emitted from the tiling unit 575 the first z-only cache tile batch 702(0) is processed by the screen-space pipeline 354. When the second z-only cache tile batch 702(1) is emitted by the tiling unit 575, the second z-only cache tile batch 702(1) is also processed by the screen-space pipeline 354. Because of the pipelined nature of the screen-space pipeline 354, work associated with the first z-only cache tile batch 702(0) and the second z-only cache tile batch 702(1) may be in the screen-space pipeline 354 at the same time, although at different units. For example, work associated with the first cache tile batch 702(0) may be at the coarse raster unit 610 while work associated with the second cache tile batch 702(1) is at setup unit 380.

When work associated with the first cache tile batch 702(0) reaches the early-z unit 640, the early-z unit 640 processes that work, writing depth information to the early-z depth buffer 650, and also providing feedback depth data to the z-cull memory 625 as described above. By issuing the second z-only cache tile batch 702(1) before issuing the first normal mode cache tile batch 704(0), the tiling unit 575 allows the first z-only cache tile batch 702(0) to progress further down the screen-space pipeline 354 than if the first normal mode cache tile batch 704(0) is issued immediately after the first z-only cache tile batch 702(0). This further progression helps to allow the early-z feedback to the z-cull memory 625 associated with the first z-only cache tile batch to complete prior to the first normal mode cache tile batch 704(0) arriving at the z-cull unit 620 for processing. Thus, this ordering allows more accurate z-cull operations to be executed. In some embodiments, the staggered mode staggers more than two cache tile batches. For example, in some embodiments, three cache tiles may be staggered. In this example, a first cache tile batch, then a second cache tile batch, and then a third cache tile batch are issued in a z-only mode, and subsequently, the first cache tile batch, the second cache tile batch, and the third cache tile batch are issued in a normal mode. Of course, more than three cache tiles may be staggered as well.

The cache tile batches depicted in FIG. 7B include a first z-only mode cache tile batch 702(0), followed by a second z-only mode cache tile batch 702(1), followed by a first normal mode cache tile batch 704(0), followed by a second normal mode cache tile batch 704(1). At the end of the cache tile batches depicted in FIG. 7A are a second-to-final normal mode cache tile batch 704(N-2) and a final normal mode cache tile batch 704(N-1). Additional cache tile batches are generated by the tiling unit 575 but are not depicted in FIG. 7B.

Figure 8:
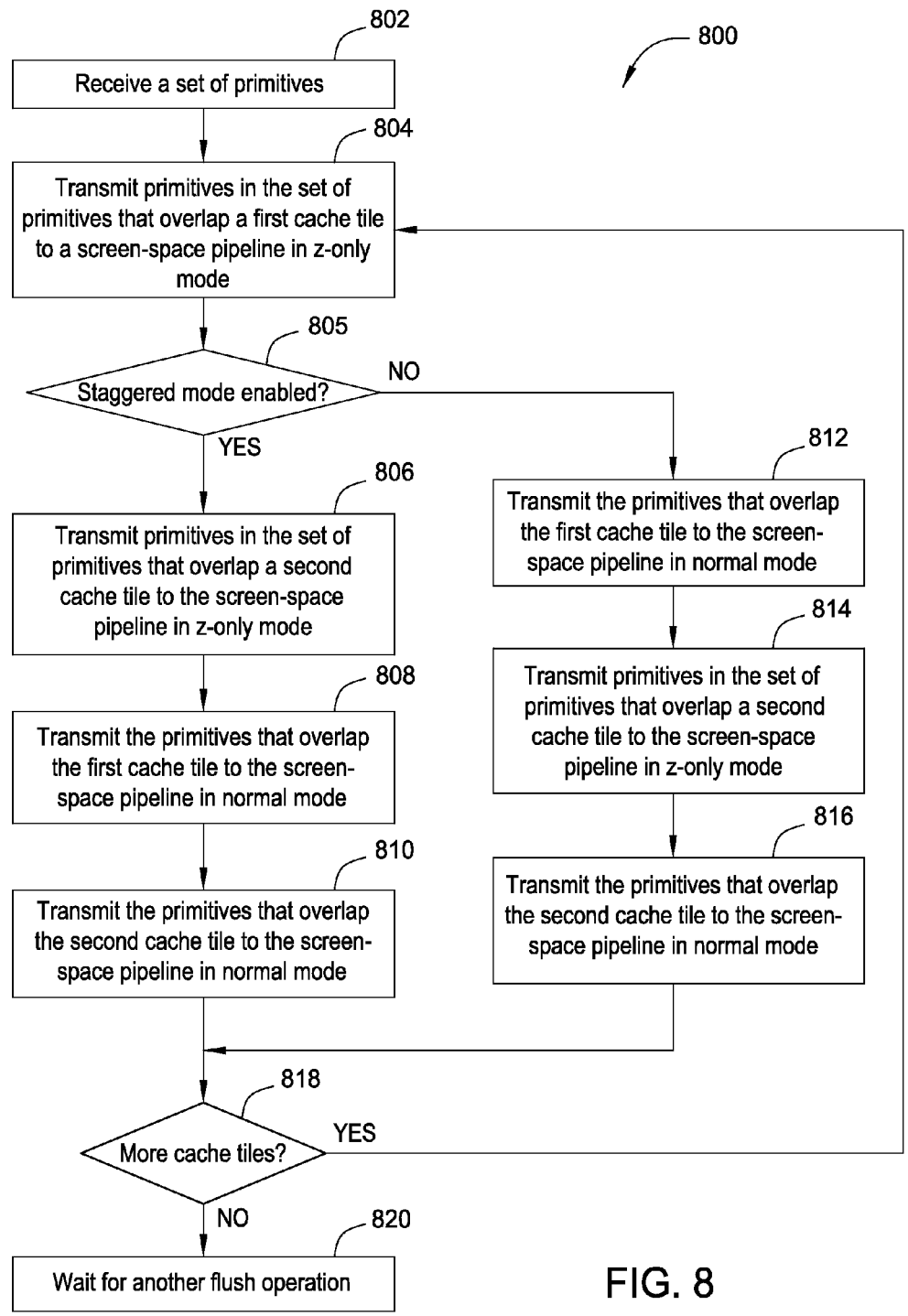
FIG. 8 is a flow diagram of method steps for executing two-pass processing for visibility testing, according to one embodiment of the present invention.

FIG. 8 is a flow diagram of method steps for executing two-pass processing for visibility testing, according to one embodiment of the present invention. Although the method steps are described in conjunction with the system of FIGS. 1-7B, persons skilled in the art will understand that any system configured to perform the method steps, in any order, falls within the scope of the present invention.

As shown, a method 800 begins in step 802, where the tiling unit 575 receives a set of primitives. In step 804, the tiling unit 575 transmits primitives in the set of primitives that overlap a first cache tile to a screen-space pipeline 354 in z-only mode. In step 805, the tiling unit 575 determines whether staggered mode is enabled. If staggered mode is enabled, then the method proceeds to step 806. In step 806, the tiling unit 575 transmits primitives in the set of primitives that overlap a second cache tile to the screen-space pipeline 354 in z-only mode. In step 808, the tiling unit 575 transmits the primitives that overlap the first cache tile to the screen-space pipeline in normal mode. In step 810, the tiling unit 575 transmits the primitives that overlap the second cache tile to the screen-space pipeline in normal mode. After step 810, the method proceeds to step 818.

If, in step 805, staggered mode is not enabled, then the method proceeds to step 812. In step 812, the tiling unit 575 transmits the primitives that overlap the first cache tile to the screen-space pipeline in normal mode. In step 814, the tiling unit 575 transmits primitives in the set of primitives that overlap a second cache tile to the screen-space pipeline in z-only mode. In step 816, the tiling unit 575 transmits the primitives that overlap the second cache tile to the screen-space pipeline in normal mode. After step 816, the method proceeds to step 818.

In step 818, the tiling unit 575 determines if there are more cache tiles in the current flush operation. If there are more cache tiles, then the method returns to step 804. If there are not more cache tiles, then the method proceeds to step 820. In step 820, the tiling unit 575 waits for another flush operation.

In sum, a tiling unit 575 generates cache tile batches and transmits the cache tile batches to a screen-space pipeline 354 for processing in two passes. In a first pass, the cache tile batch is processed in z-only mode, in which the pixel shader 390 is disabled and therefore does not execute pixel shading programs on incoming fragments. In a second pass, the cache tile batch is processed in normal mode, in which the pixel shader 390 executes pixel shading programs on incoming fragments. The tiling unit 575 may also stagger cache tile batches by transmitting two z-only mode cache tile batches followed by two normal mode cache tile batches. Staggering cache tile batches in this manner allows for depth-related feedback mechanisms to write depth data to a z-cull memory.

One advantage of the disclosed approach is that early visibility testing is performed in a tile-based architecture with "look-ahead" depth data. Thus, more fragments may be discarded prior to fragment shading than without the "look-ahead" depth data. Another advantage is that early visibility testing is performed on cache tiles with a relatively low amount of overhead related to reading data in to or evicting data from a cache. In particular, the depth data remains resident in the cache in the period between the z-only mode and the normal mode, thus saving memory bandwidth.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What we claim is:

1. A graphics processing system configured to perform visibility testing in a tile-based architecture, the graphics processing system comprising:
a screen-space pipeline configured to perform visibility testing and fragment shading operations; and
a tiling unit configured to:
determine that a first set of primitives overlaps a first cache tile,
first transmit the first set of primitives to the screen-space pipeline with a first command configured to cause the screen-space pipeline to process the first set of primitives in a z-only mode, and
then transmit the first set of primitives to the screen-space pipeline with a second command configured to cause the screen-space pipeline to process the first set of primitives in a normal mode,
wherein in the z-only mode, at least some fragment shading operations are disabled in the screen-space pipeline and in the normal mode, fragment shading operations are enabled in the screen-space pipeline, and wherein the first set of primitives is processed only once by a world-space pipeline.

2. The graphics processing system of claim 1, wherein the screen-space pipeline includes a z-cull unit configured to perform z-cull operations, a late-z unit configured to perform late visibility testing, and a fragment shader unit configured to perform the fragment shading operations, wherein the visibility testing comprises both the z-cull operations and the late visibility testing.

3. The graphics processing system of claim 1, wherein the screen-space pipeline includes a z-cull unit configured to perform z-cull operations, an early-z unit configured to perform early visibility testing, and a fragment shader unit configured to perform the fragment shading operations, wherein the visibility testing comprises both the z-cull operations and the early visibility testing.

4. The graphics processing system of claim 3, wherein the tiling unit is further configured to:
determine that a second set of primitives overlaps a second cache tile,
first transmit the second set of primitives to the screen-space pipeline with a third command configured to cause the screen-space pipeline to process the second set of primitives in a z-only mode, and
then transmit the second set of primitives to the screen-space pipeline with a fourth command configured to cause the screen-space pipeline to process the second set of primitives in a normal mode.

5. The graphics processing system of claim 4, wherein the tiling unit is further configured to operate in a non-staggered mode, in which the first cache tile is transmitted in both the z-only mode and the normal mode and then the second cache tile is transmitted in both the z-only mode and the normal mode.

6. The graphics processing pipeline of claim 4, wherein the early-z unit is further configured to provide feedback depth information to the z-cull unit upon processing primitives.

7. The graphics processing pipeline of claim 6, wherein the tiling unit is further configured to operate in a staggered mode, in which the first cache tile is transmitted in the z-only mode, then the second cache tile is transmitted in the z-only mode, then the first cache tile is transmitted in the normal mode, and then the second cache tile is transmitted in the normal mode.

8. The graphics processing pipeline of claim 7, wherein operating the tiling unit in the staggered mode allows the first cache tile in the z-only mode to proceed to the early-z unit before the first cache tile in the normal mode proceeds to the z-cull unit, which allows the early-z unit to provide the feedback depth information for the first cache tile to the z-cull unit.

9. The graphics processing pipeline of claim 1, wherein in the z-only mode, the visibility testing is performed only for opaque geometry.

10. A computing device configured to perform visibility testing in a tile-based architecture, the computing device comprising:
a graphics processing pipeline, comprising:
a screen-space pipeline configured to perform visibility testing and fragment shading operations, and
a tiling unit configured to:
determine that a first set of primitives overlaps a first cache tile, first transmit the first set of primitives to the screen-space pipeline with a first command configured to cause the screen-space pipeline to process the first set of primitives in a z-only mode, and then transmit the first set of primitives to the screen-space pipeline with a second command configured to cause the screen-space pipeline to process the first set of primitives in a normal mode, wherein in the z-only mode, at least some fragment shading operations are disabled in the screen-space pipeline and in the normal mode, fragment shading operations are enabled in the screen-space pipeline, and wherein the first set of primitives is processed only once by a world-space pipeline.

11. The computing device of claim 10, wherein the screen-space pipeline includes a z-cull unit configured to perform z-cull operations, a late-z unit configured to perform late visibility testing, and a fragment shader unit configured to perform the fragment shading operations, wherein the visibility testing comprises both the z-cull operations and the late visibility testing.

12. The computing device of claim 10, wherein the screen-space pipeline includes a z-cull unit configured to perform z-cull operations, an early-z unit configured to perform early visibility testing, and a fragment shader unit configured to perform the fragment shading operations, wherein the visibility testing comprises both the z-cull operations and the early visibility testing.

13. The computing device of claim 12, wherein the tiling unit is further configured to:

determine that a second set of primitives overlaps a second cache tile, first transmit the second set of primitives to the screen-space pipeline with a third command configured to cause the screen-space pipeline to process the second set of primitives in a z-only mode, and then transmit the second set of primitives to the screen-space pipeline with a fourth command configured to cause the screen-space pipeline to process the second set of primitives in a normal mode.

14. The computing device of claim 13, wherein the tiling unit is further configured to operate in a non-staggered mode, in which the first cache tile is transmitted in both the z-only mode and the normal mode and then the second cache tile is transmitted in both the z-only mode and the normal mode.

15. The computing device of claim 13, wherein the early-z unit is further configured to provide feedback depth information to the z-cull unit upon processing primitives.

16. The computing device of claim 15, wherein the tiling unit is further configured to operate in a staggered mode, in which the first cache tile is transmitted in the z-only mode, then the second cache tile is transmitted in the z-only mode, then the first cache tile is transmitted in the normal mode, and then the second cache tile is transmitted in the normal mode.

17. The computing device of claim 16, wherein operating the tiling unit in the staggered mode allows the first cache tile in the z-only mode to proceed to the early-z unit before the first cache tile in the normal mode proceeds to the z-cull unit, which allows the early-z unit to provide the feedback depth information for the first cache tile to the z-cull unit.

18. The computing device of claim 10, wherein in the z-only mode, the visibility testing is performed only for opaque geometry.

19. A method for performing visibility testing in a tile-based architecture, the method comprising:

determining that a first set of primitives overlaps a first cache tile;

first transmitting the first set of primitives to a screen-space pipeline with a first command configured to cause the screen-space pipeline to process the first set of primitives in a z-only mode; and then transmitting the first set of primitives to the screen-space pipeline with a second command configured to cause the screen-space pipeline to process the first set of primitives in a normal mode, wherein in the z-only mode, at least some fragment shading operations are disabled in the screen-space pipeline and in the normal mode, fragment shading operations are enabled in the screen-space pipeline, and wherein the first set of primitives is processed only once by a world-space pipeline.

20. The method of claim 19, further comprising performing visibility testing on the first set of primitives in both the z-only mode and the normal mode, wherein the visibility testing comprises both z-cull operations and early visibility testing.

* * * * *